United States Patent
Green

[11] 3,810,397
[45] May 14, 1974

[54] AUTOMATIC SLACK ADJUSTER FOR CABLE CYLINDER ASSEMBLY

[76] Inventor: Joseph H. Green, 7332 Greenfield Rd., Dearborn, Mich. 48126

[22] Filed: Dec. 4, 1972

[21] Appl. No.: 311,880

[52] U.S. Cl. .............................. 74/110, 188/196
[51] Int. Cl. ............................................ F16h 21/44
[58] Field of Search.... 74/522, 110; 188/196, 196 F

[56] References Cited
UNITED STATES PATENTS

| | | | |
|---|---|---|---|
| 968,377 | 8/1910 | Marce | 188/196 F |
| 1,659,544 | 2/1928 | Dodge | 188/196 F |
| 2,196,799 | 4/1940 | Keplinger | 188/196 F |

Primary Examiner—Samuel Scott
Assistant Examiner—Wesley S. Ratliff, Jr.

[57] ABSTRACT

An automatic slack adjuster for the cables of a cable cylinder assembly having a work piece supporting bracket at the outboard ends of the cables. The invention resides in the provision of threaded fittings secured to the ends of said cables and slideable in bores formed in the bracket, and spring biased nuts rotatable on said fittings with means to permit the longitudinal movement but prevent the radial movement of said fittings when slack develops in either of said cables.

6 Claims, 9 Drawing Figures

PATENTED MAY 14 1974  3,810,397

AUTOMATIC SLACK ADJUSTER FOR CABLE CYLINDER ASSEMBLY

This invention relates to slack adjusters and has particular reference to an automatic slack adjuster for reciprocating cables, such as employed in a cable cylinder assembly.

An object of the invention is to provide means for taking up slack in a cable, which is alternately under load from one end to the opposite end.

Another object of the invention is to provide means for automatically taking up the slack in the cable of a cable-cylinder assembly, although the invention is not confined to such a structure.

Another object of the invention is to provide a device, which will obviate the necessity of making manual adjustments to reciprocating cable ends, thereby reducing "down time" in a production operation.

Another object of the invention is to provide automatic means for maintaining tension on a reciprocating cable the ends of which are located in remote and inaccessible places.

The foregoing and other objects and advantages of the invention will appear as the description proceeds, reference being made from time to time to the accompanying drawing, in which drawing.

Figure 1:
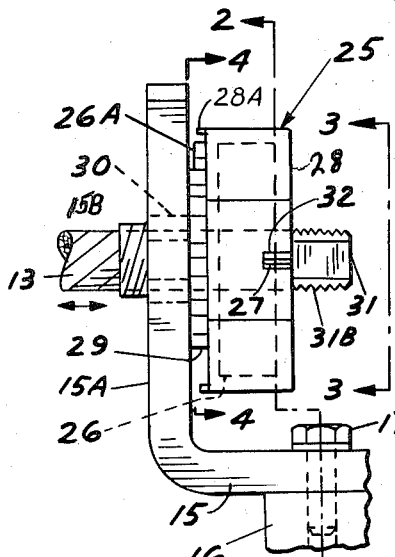
FIG. 1, is an elevational view, with parts broken away, of a device embodying the invention.

Referring now more particularly to the drawing, it will be understood that in the embodiment herein disclosed (FIG. 9), the invention is illustrated as being used in a cable-cylinder hookup, although, I do not intend to be limited to such an application.

Figure 9:
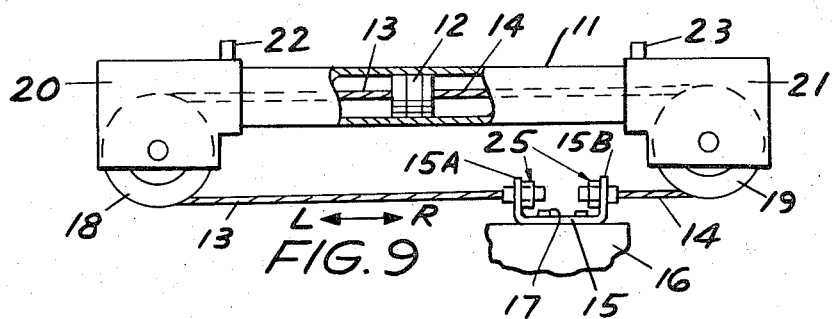
FIG. 9, is an elevational view, with parts broken away, and parts in section showing the invention device, used on a conventional cable-cylinder assembly.

In FIG. 9, I illustrate a conventional cable-cylinder assembly consisting of a double acting air cylinder 11, having a piston 12, reciprocable therein. To each face of the piston 12 is secured one end of cables 13 and 14. The other ends of the cables 13 and 14 are secured to the legs 15A–15B of a "U" shaped bracket 15, to which a work piece 16 is attached by bolts 17, or other suitable means. The cables 13 and 14 extend over pulleys 18 and 19, which are supported for rotation in fittings 20 and 21, secured to the ends of the cylinder 11. Air, or hydraulic fluid, is supplied to the cylinder 11 through intake fittings 22, 23.

If either cable 13 or 14 (FIG. 9) becomes slack, on the return of a work stroke, the cable will either jump its pulley, or ride up on the pulley lip and become damaged. It is obvious therefore, that the cables 13 and 14 must be held in a tight condition. Heretofore it has been the practice to provide the bracket ends 15A–15B of the cables 13 and 14, with threaded fittings and conventional nuts, which could be manually turned against the upturned legs 15A–15B of the bracket 15, to take up the slack. Manual adjustment is time consuming and very difficult of attainment, if the cylinder assembly is remotely located.

To obviate these difficulties, I have developed automatic means for keeping the slack out of the cables 13 and 14. The invention device is generally indicated with the reference character 25, (FIG. 1), and as shown in FIG. 9, two of the invention devices 25 are required to effect the result, one at the bracket 15 end of each cable 13 and 14. Although, I herein describe only one of the devices 25, it will be understood that the other one shown in FIG. 9, is exactly the same only oppositely disposed.

Figure 2:
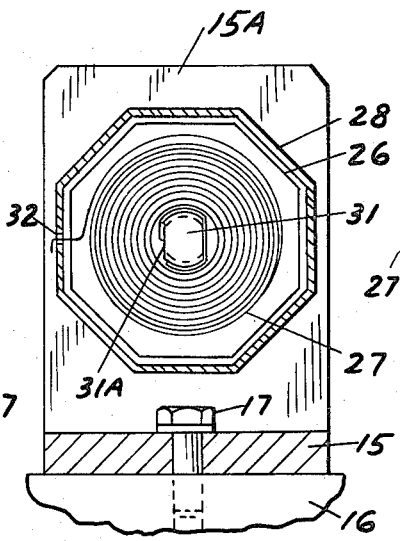
FIG. 2, is a section taken on line 2—2 of FIG. 1.
Figure 3:
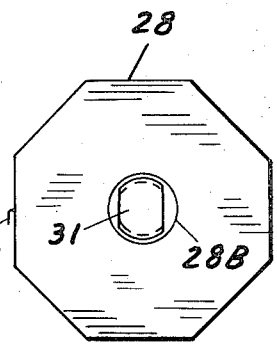
FIG. 3, is an elevational view taken on the line 3—3 of FIG. 1.
Figure 5:
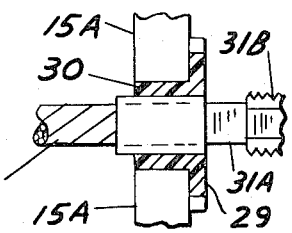
FIG. 5, is a section taken on line 5—5 of FIG. 4.
Figure 4:
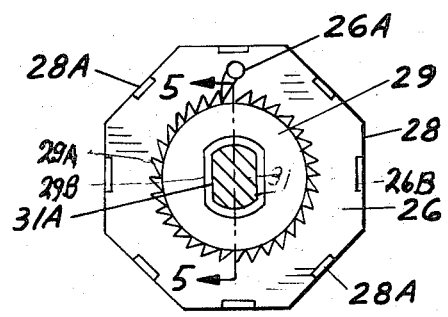
FIG. 4, is a section taken on line 4—4 of FIG. 1.
Figure 6:
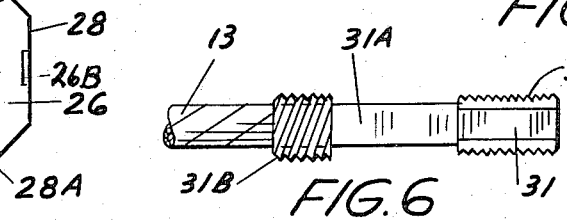
FIG. 6, is an enlarged elevation, of one end of the cable with fittings attached.

Each device 25, (FIG. 1) consists of a nut 26, a spring 27, (FIGS. 1 and 2) a cover, or cage 28 (FIGS. 1 and 3) and a nylon thrust bearing member 29, having a hub like extension 30, (FIG. 5) forming a radial bearing, which is received in a suitable bore formed in the leg 15A of the bracket 15. As shown in FIG. 2, one end of the spring 27, is positioned around the flat sides 31A of a fitting 31, which is swaged, or otherwise secured, to the end of the cable 13. The other end of the spring 27, engages an opening 32 in the side of the cage or cover 28. When the spring 27 is wound up, tight in an anti-clockwise direction, it is prevented from unwinding in the event of the spring breaking by the ratchet teeth 29A (FIG. 4) formed on the periphery of the thrust bearing 29, and a dog 26A carried on the side of the nut 26. The cage 28 is held on the nut 26 by means of a plurality of bent over ears 28A. The nut 26 and the thrust bearing 29 (FIG. 4) each has an opening therethrough, with two flat sides 26B and 29B, which are received on two flat sides 31A formed on the fitting 31. The fitting 31 is threaded as at 31B (FIG. 1) to receive the nut 26 and the bore in the hub portion 30 of the bearing 29, and the opening 28B of the cage 28 are large enough to permit the threads 31B to pass through as a nut 26 and the thrust bearing 29 are permitted to slide axially on the flats 31A of the fitting 31 as hereinafter described.

To assemble the device the threaded end 31 of the cable 13 is first extended through a bore 15B in the leg 15A of the bracket 15. The bearing 29–30 is placed in position and the nut 26 is threaded onto the fitting 31, so that the thrust bearing portion 29 rests between the leg 15A and the nut 26, and the hub 30 forming the radial bearing is in the bore 15B in the leg 15A. The cage 28 carrying the spring 27 is then placed in position and turned anti-clockwise until the spring is fully wound. The cage 28 is then made secure to the nut 26 by the ears 28A. The spring 27 is now held against unwinding by the dog 26A and ratchet 29A.

The device operates as follows:

Referring to FIG. 9, when the piston 12 moves to the left, the cable 14 will be under load and the cable 13 will not be under load. In other words, the cable 13 will now be on the slack side of the device. If any wear, or stretching, should occur in either the cable 13 or 14, there will develop in one side, or the other, a certain degree of slack, as the bracket 15 and the work piece 16 reciprocate from left to right. Assuming that the slack develops in the cable 13, the tension on the cable and between the nut 26 and the leg 15A, will be released, permitting the nut and cage assembly to slide axially on the flats 31A of the fitting 31. At the same time, the nut 26, under the influence of the spring 27, will tend to rotate in a clockwise direction. Any rotation of the nut in a clockwise direction, under the influence of the spring 27, will also cause longitudinal movement of the nut on the flats of the member 31; thereby, shortening the cable in proportion to the rotation of the nut on the threads 31B, in other words, the rotation of the nut will move the cable longitudinally, with respect to the leg 15A, of the bracket 15, thereby, taking the slack out of the cable and replacing the tension therein. The device 25, mounted on the leg 15B, works similarly with reference to slack in cable 14.

Figure 7:
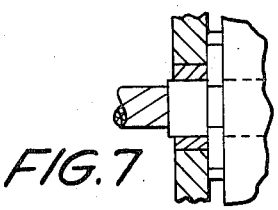
FIG. 7, is a detail, showing a modified bearing assembly.
Figure 8:
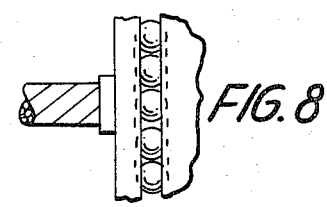
FIG. 8, is a detail, showing another modified bearing assembly.

Although I have shown the bearing 29 as consisting of a washer-like thrust bearing portion, and a bushing-like radial bearing portion in integrated relation, it will be understood that the thrust bearing portion and the radial bearing portion, may be made separately, and of different materials as shown in FIGS. 7 and 8. In any event, I prefer to make the bearing elements of "Nylon" or other suitable material. In certain applications I have found that the thrust bearing 29 and the radial bearing 30 may be eliminated if conventional lubrication is applied to the parts during assembly. It will be understood that the relative movement between the nut 26 and the fitting 31 at each end of the cable is very slight, only movement enough to compensate for wear or stretch of the cable. It will also be understood that the ratchet 29A and the dog 26A may be eliminated for the reason that, when the spring 27 is wound up in an anti-clockwise direction, it will remain so wound as long as it remains intact, because of its connection to the nut 26 and the cover 28. The ratchet 29A and dog 26A are therefore only needed in the event of the breaking of the spring 27. Otherwise, the device functions and operates, as hereinabove described.

It is believed that the operation of the device is obvious from the foregoing description.

Having described my invention, what I claim and desire to secure by Letters Patent is:

1. In a cable cylinder device of the character described, including reciprocating cables and anchor means for the ends thereof, the improvement consisting of an externally threaded terminal fitting respectively secured to one end of each cable, and slideable in a bore formed in its anchor means, each fitting having means to prevent its radial movement but permit its longitudinal movement in said bore, a nut, rotatable on said threads, there being a spring secured, at one end, to said nut and secured, at the other end, to a cage member, which houses said spring and said nut.

2. The structure of claim 1, including a thrust bearing, having a ratchet formed on its periphery and a dog carried by said nut arranged to contact said ratchet to prevent the rotation of the nut in one direction.

3. The structure of claim 2, in which said thrust bearing has a hollow hub like extension, which is received in the bore of said anchor means and serves as a radial bearing for said terminal fitting.

4. The structure of claim 1, in which said anchor means is a "U" shaped bracket having means thereon for holding a workpiece.

5. The structure of claim 1, in which the said spring, and said nut, are caged in a cup like cover, which is secured to the inboard face of said nut by integral ears.

6. The combination with a double acting pneumatic cylinder having a piston therein, of cables respectively attached to each end of said piston and to anchor means carried by a work piece bracket, there being a threaded fitting on each cable arranged to slide in a bore formed in its anchor means, means to permit the longitudinal movement but prevent the radial movement of said fitting, a nut rotatable on threads formed on said fitting, and a flat spring coiled about each said fitting and secured at one end to said fitting and secured at the other end to a cup like member which houses said nut and said spring.

* * * * *